A. Hunt,
Wheel Cultivator.
No. 113,520.                    Patented Apr. 11, 1871.
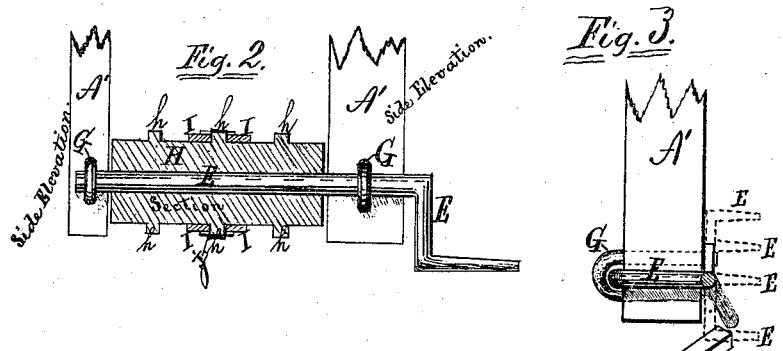
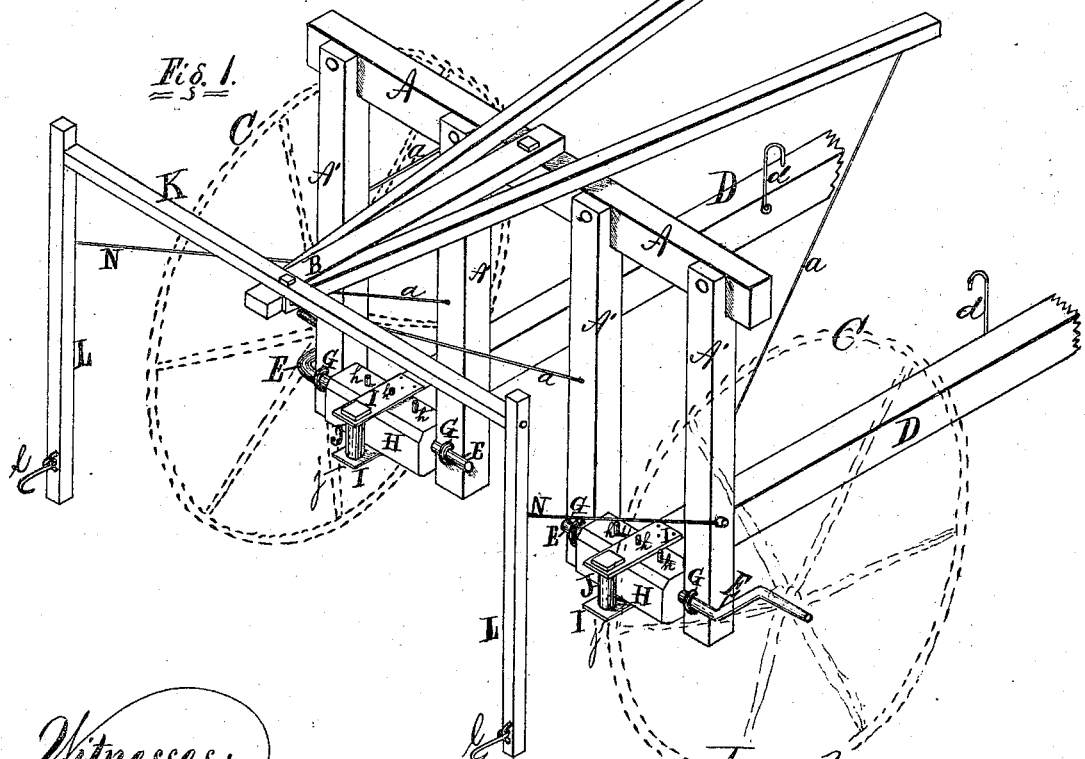

UNITED STATES PATENT OFFICE.

ALMON HUNT, OF MACOMB, ILLINOIS.

IMPROVEMENT IN CULTIVATORS.

Specification forming part of Letters Patent No. 113,520, dated April 11, 1871.

*To all whom it may concern:*

Be it known that I, ALMON HUNT, of Macomb, in the county of McDonough and State of Illinois, have invented certain Improvements in Cultivators, of which the following is a specification.

The nature of my invention relates to improvements in that class of cultivators known as the "walking-cultivator;" and the invention consists, first, in improvements in the joint or coupling by which the plow-beams are attached to the main frame, all as hereinafter fully described; second, in the arrangement of devices for raising and lowering the main frame, and thereby adjusting the depth of running, all as hereinafter fully described; third, in the arrangement of devices, in combination with the main frame and coupling, for relieving "neck-draft," all as hereinafter fully described.

In the accompanying drawings, Figure 1 is a perspective view of a machine embodying my invention. Fig. 2 is an elevation partly in section of detached portions of Fig. 1. Fig. 3 is an elevation of a detached portion of Fig. 1.

A A' A' A' A' represent the main frame, consisting of a horizontal bar, A, supported by a pair of uprights, A' A', at each end, the whole being supported and strengthened by the braces $a\ a\ a\ a$, running from the uprights A' to the draft-pole B, which, in turn, is supported on the elevated bar A.

C C represent the wheels, of ordinary construction, for supporting the main frame.

D D are the beams of ordinary cultivator-plows, provided with hooks $d\ d$, by which the rear ends of the plow-beams may be held in an elevated position by engaging the said hooks with the rear braces, $a\ a$.

E E are the axles, crank-shaped, as plainly shown in the drawings, and secured to the lower ends of the uprights A' A' A' A' by the hook-bolts G G G G, their outer ends forming the spindles for the wheels C C.

H H are thimbles, made of any suitable metal, and the holes through them longitudinally corresponding with and fitting neatly on the crank-axles E E, between the uprights A' A' A' A'. The thimbles H H are cast solid, with their upper and lower sides flat, with studs $h\ h\ h\ h\ h\ h$ projecting therefrom.

I I are the beam-plates, secured at one end to the ends of the beams D D, and their other ends projecting beyond the thimbles H H far enough to receive the bolts J J, with nuts $j\ j$. The beam-plates I I are pierced near their central portion for the reception of the studs $h\ h$.

K is the double-tree, pivoted on the draft-pole B, and has pendants L L from each end, to the lower ends of which the hooks $l\ l$ are attached, for hitching thereto the draft-animals. From near the centers of the pendants L L rods N N extend to the uprights A' A'.

The operations of my invention are deemed simple from an inspection of the drawings.

To adjust the depth of running of the plows, it is only necessary to loosen the nuts on the shanks of the hook-bolts G, when the crank-axles E E may be easily turned to raise or lower the main frame, and with it the beams D D, as desired, and as shown by the dotted and full lines at Fig. 3, which is a side view of one of the outside uprights A' and the crank-axle E and hook-bolt G.

To adjust the distance of the plows apart, the nut on the bolts J J may be loosened, and the hole through the central portion of the beam-plates I I placed over either of the series of studs $h\ h\ h$, when, the nuts $j\ j$ being again tightened up, the beams D D may be freely moved to the right or left on the studs $h$ as pivots, to avoid any plants which may be out of line, or for other purposes. Vertical movement, or the necessary up-and-down movement, of the rear ends of the plow-beams is obtained by the thimbles H H revolving or turning on the axles E E. This arrangement of the coupling connecting the beams D with the main frame, it will be plainly seen, will allow perfect freedom in the usual and necessary movements of the plow-beams, while at the same time it will prevent wabbling or vibratory twisting or turning of the rear ends of said beams, holding them perfectly steady. The nuts $j\ j$ may be tightened up, also, at any time, to compensate for wear.

The arrangement of the draft-equalizer K L L N N, it will be seen, allows a free oscillating movement of the double-tree K, at the same time connecting the draft, by the rods N N, to near the lower ends of the uprights A' A', and thereby removing all neck-draft from the team.

I claim as my invention—

1. A wheel-cultivator composed of frame A A', axles E, bolts G, thimbles H, having studs h, beams D, plates I, and bolts J, pole B, and equalizer K L N, the whole constructed and operating substantially as and for the purposes set forth.

2. The thimbles H, constructed as described, and arranged to operate with axles E and beams D, as and for the purpose set forth.

ALMON HUNT.

Witnesses:
J. N. PEARSON,
ASA A. MATTESON.